(12) United States Patent
Li et al.

(10) Patent No.: US 8,238,118 B2
(45) Date of Patent: Aug. 7, 2012

(54) ELECTRONIC DEVICE HAVING RETRACTABLE HANGER

(75) Inventors: Ming Li, Shenzhen (CN); Bo Peng, Shenzhen (CN); Wen-Hsing Lin, Taipei Hsien (TW); Kun-Chih Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 227 days.

(21) Appl. No.: 12/817,212

(22) Filed: Jun. 17, 2010

(65) Prior Publication Data

US 2011/0096523 A1 Apr. 28, 2011

(51) Int. Cl.
*H05K 7/02* (2006.01)
*H05K 7/04* (2006.01)
(52) U.S. Cl. .................. 361/807; 361/727; 361/802
(58) Field of Classification Search .................. 361/600, 361/679.01, 807, 810, 727, 756, 741, 686, 361/802; 40/299.01, 599; 248/317, 318; 223/DIG. 4, 223, 88, 185, 89; 211/189, 205, 211/13.1, 85, 186.01, 113; 224/309, 311, 224/400, 488, 492, 493, 572, 545, 555, 560, 224/927

See application file for complete search history.

(56) References Cited

U.S. PATENT DOCUMENTS

| | | | | | |
|---|---|---|---|---|---|
| 4,632,242 | A | * | 12/1986 | Choi et al. | 206/45.24 |
| 6,181,550 | B1 | * | 1/2001 | Kim | 361/679.06 |
| 6,256,842 | B1 | * | 7/2001 | Ina | 24/194 |
| 7,234,672 | B1 | * | 6/2007 | Osterholt et al. | 248/304 |
| 7,894,850 | B2 | * | 2/2011 | Chen | 455/550.1 |
| 8,070,242 | B2 | * | 12/2011 | Makabe | 312/223.1 |
| 2002/0158096 | A1 | * | 10/2002 | Wang | 224/271 |

* cited by examiner

*Primary Examiner* — Hung S Bui
(74) *Attorney, Agent, or Firm* — Altis Law Group, Inc.

(57) ABSTRACT

An electronic device having retractable hanger includes a housing, a display panel, and a hanging mechanism. The display panel is mounted on the housing. The hanging mechanism is arranged in the housing. The hanging mechanism includes a base, a hanger, a movable member, and at least one resilient member. The base is secured in the housing. The hanger slides relative to the base and defines a hanging hole, a groove with corners, and protrusions by each corner. The movable member includes a first end and a second end, wherein the first end is rotatably connected to the base and the second end slides in the groove of the hanger.

8 Claims, 7 Drawing Sheets

ELECTRONIC DEVICE HAVING RETRACTABLE HANGER

BACKGROUND

1. Technical Field

The present disclosure relates to portable electronic devices and, more particularly, to a portable electronic device having retractable hanger.

2. Description of Related Art

Some electronic devices, such as digital photo frames, include a hanging hole defined therein, so that a nail or screw can be used to hang the device on a wall. However, when such a device is not hung on the wall, the hanging holes will be visible and unattractive.

Therefore, what is needed is an electronic device to overcome the shortcoming described above.

BRIEF DESCRIPTION OF THE DRAWINGS

The components of the drawings are not necessarily drawn to scale, the emphasis instead being placed upon clearly illustrating the principles of an electronic device having a retractable hanger. Moreover, in the drawings, like reference numerals designate corresponding parts throughout several views.

DETAILED DESCRIPTION

Figure 1:
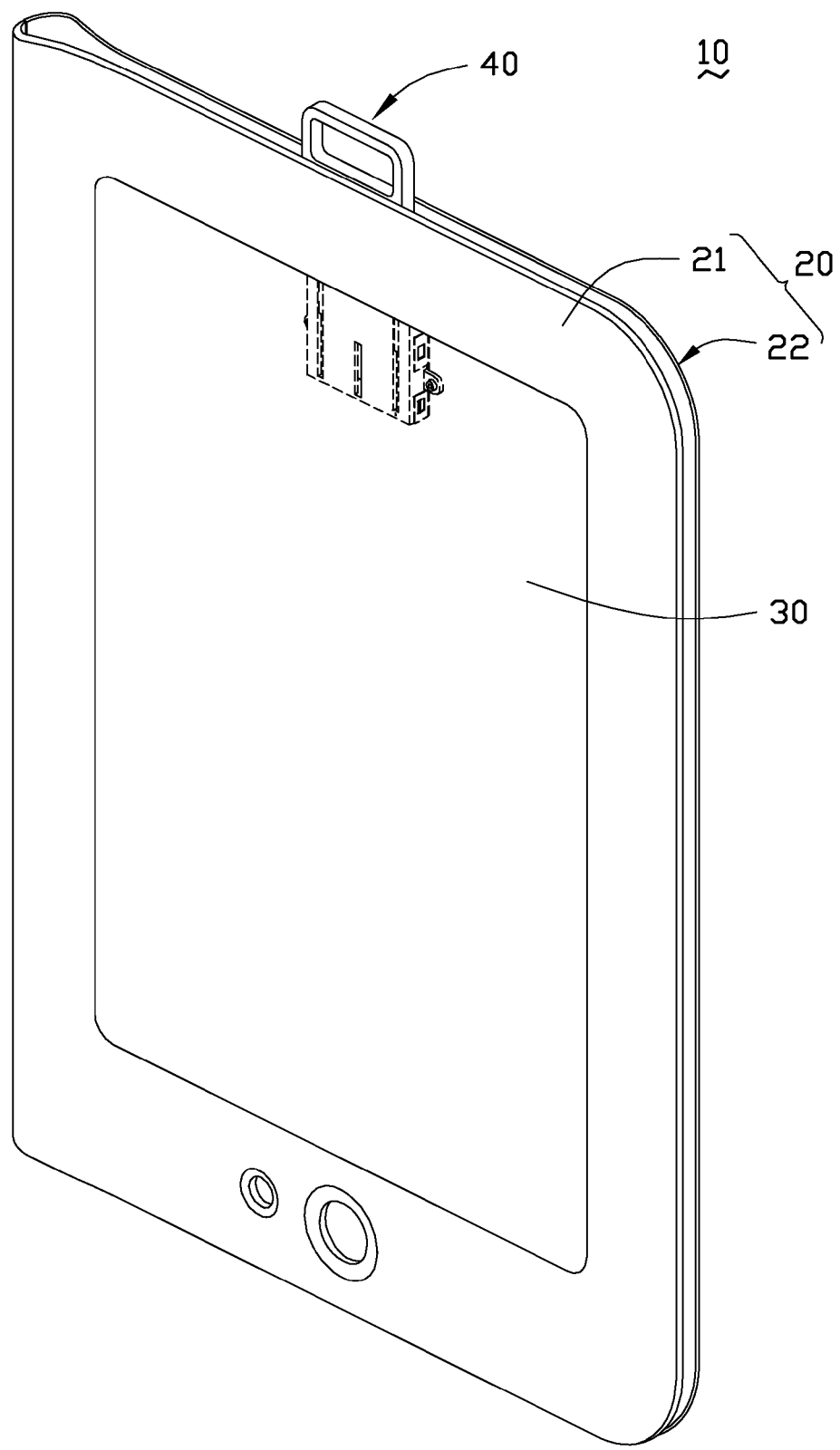
FIG. 1 is an isometric view of an electronic device in accordance with an exemplary embodiment, showing a hanger in an extended state.
Figure 2:
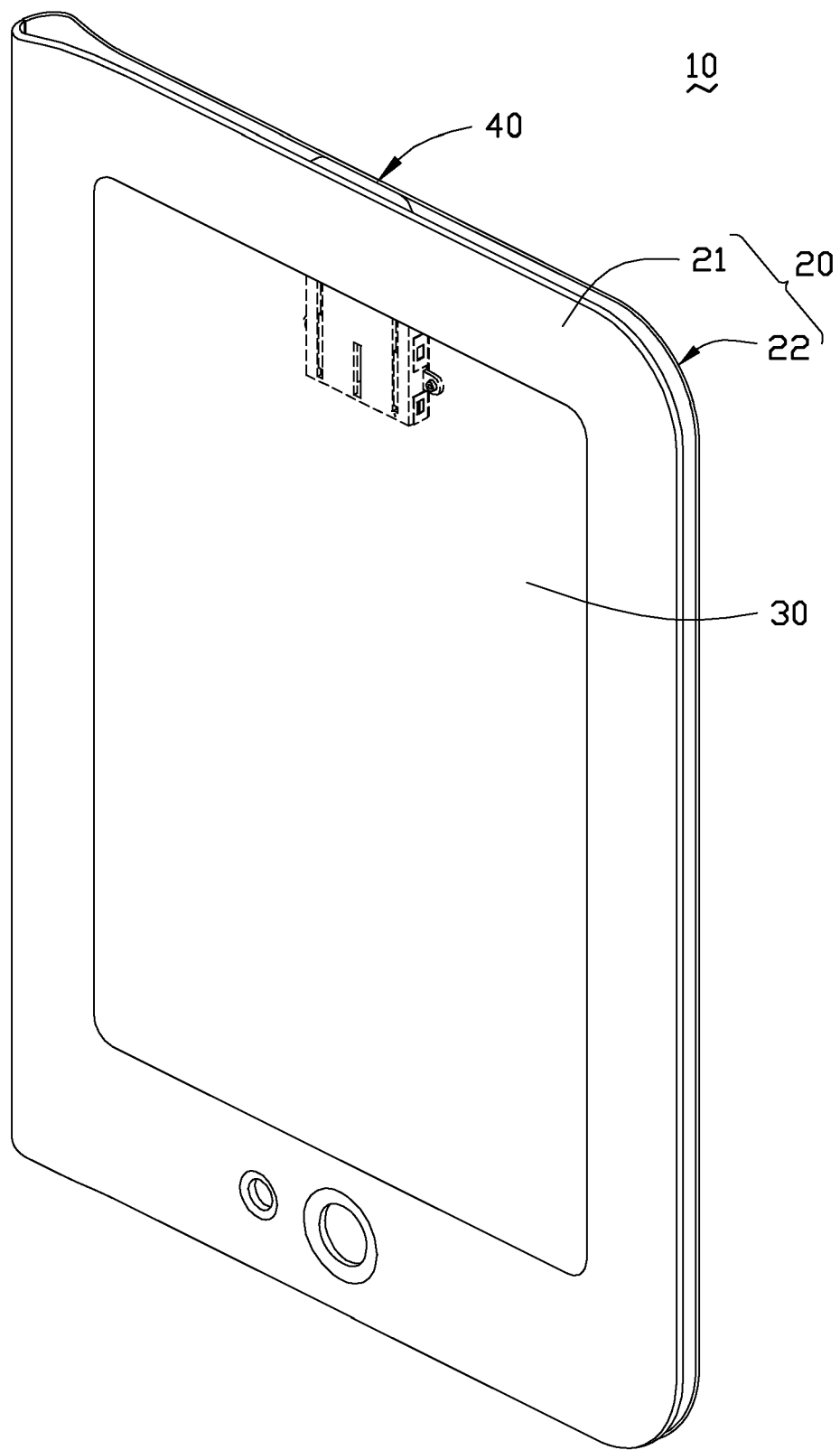
FIG. 2 is similar to FIG. 1, but showing the hanger in a retracted state.

Referring to FIGS. 1-2, an electronic device 10 in accordance with an exemplary embodiment is illustrated. The electronic device 10 includes a housing 20, a display panel 30, and a hanging mechanism 40. The housing 20 includes a front shell 21 and a rear shell 22 fastened together. The display panel 30 is coupled to the front shell 21. The hanging mechanism 40 is retractably disposed between the front shell 21 and the rear shell 22.

Figure 3:
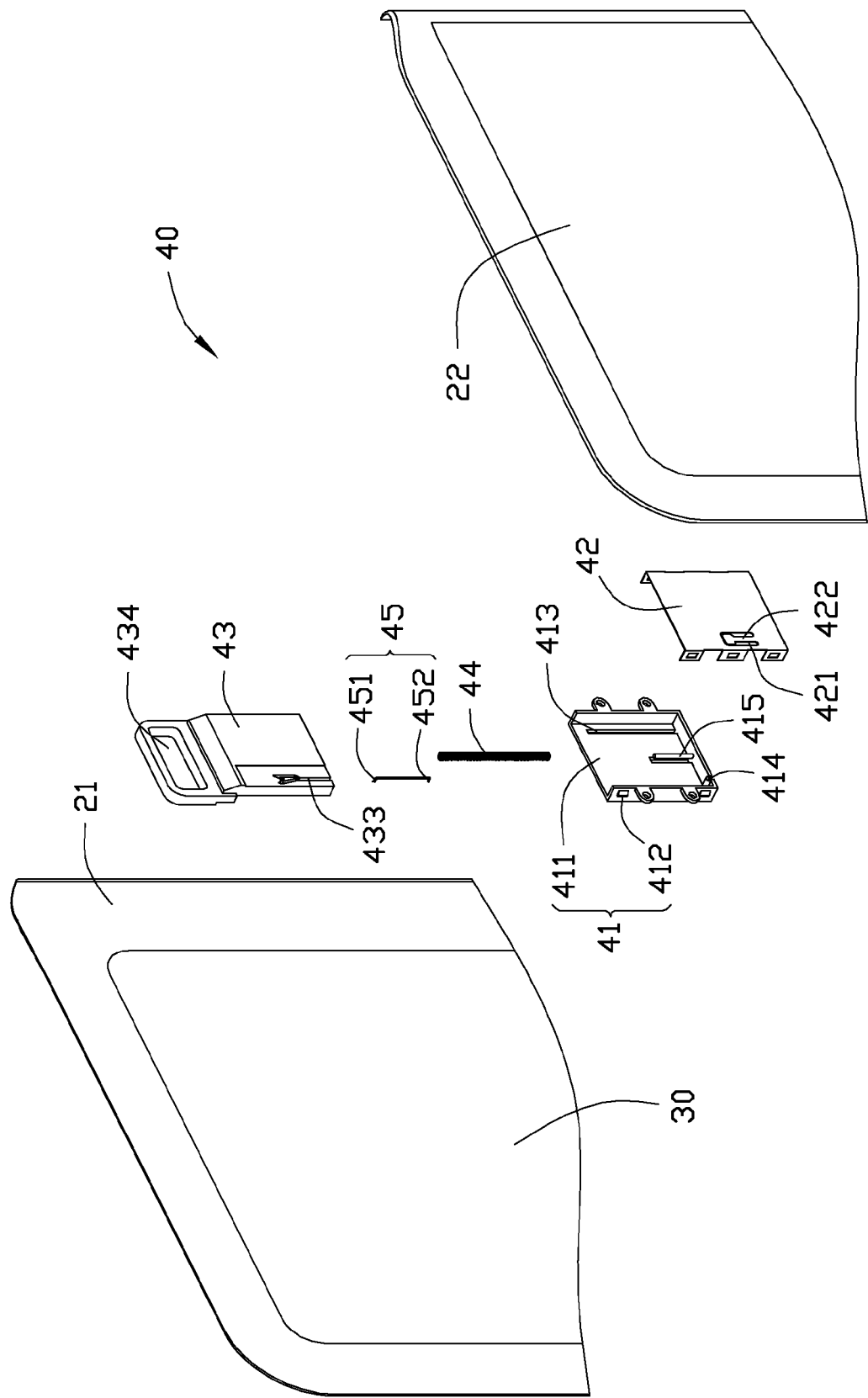
FIG. 3 is a partial, exploded view of the electronic device of FIG. 1.

Referring to FIG. 3, the hanging mechanism 40 includes a base 41, a cover 42, a hanger 43, at least one resilient member 44, and a movable member 45. The base 41 includes a bottom wall 411 and three sidewalls 412 protruding from the bottom wall 411 in the same direction all cooperating to define a receiving space. The bottom wall 411 defines two slots 413 (one not shown) both parallel to two opposite sidewalls 412. The remaining sidewall 412 defines a hole 414 and a rod 415. The rod 415 is substantially parallel to the slots 413. The centerline of the hole 414 is substantially perpendicular to the bottom wall 411. The base 41 is secured between the front shell 21 and the rear shell 22.

The cover 42 is shaped like and arranged on the base 41. The cover 42 defines an opening 421 and a spring tab 422 with one end free in the opening 421, which constitutes a cantilevered structure. The spring tab 422 can thus be elastically deflected under pressure.

Figure 4:
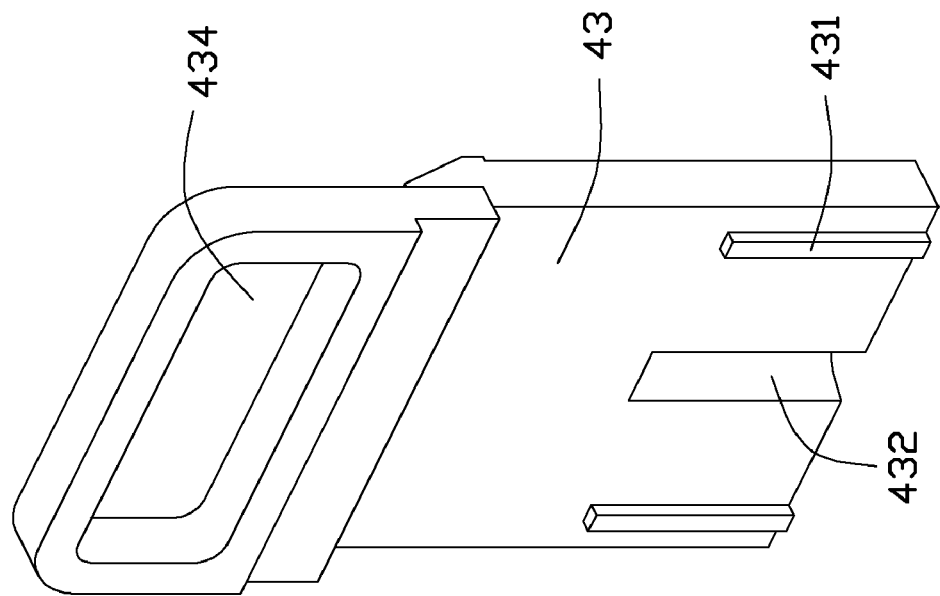
FIG. 4 is an isometric view of the hanger of FIG. 1.

Referring also to FIG. 4, the hanger 43 is a rectangular plate and defines two ribs 431 on one side, a cavity 432 between the ribs 431, and a groove 433 in the opposite side. The hanger 43 further defines a hanging hole 434 in the top end. The hanger 43 is retained within the receiving space of the base 41 with the ribs 431 slidably received in the slots 413 of the base 41, allowing the ribs 431 to slide along the slots 413. The hanger 43 can thus move from a retracted state to an extended state, exposing the hanging hole 434 to allow a fastener such as a nail or screw (not shown) to pass through. The electronic device 10 can thus be secured to a support, such as a wall.

Figure 5:
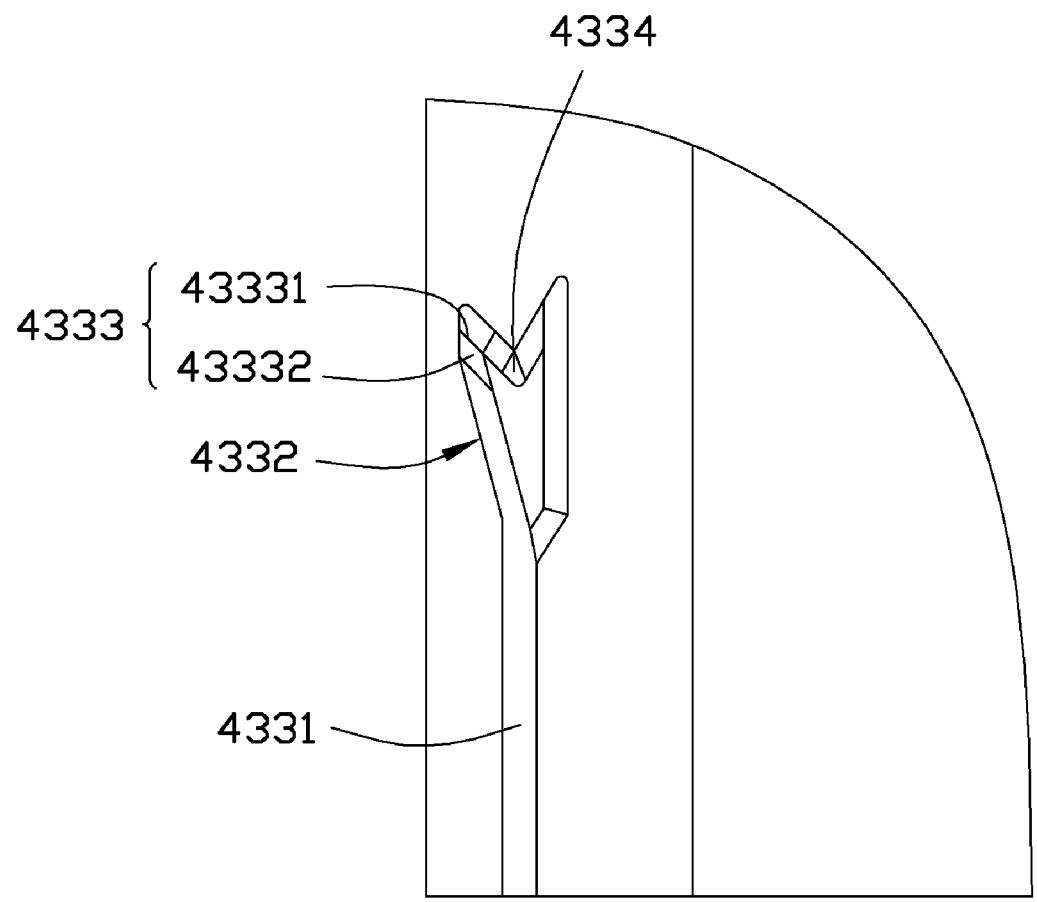
FIG. 5 is an enlarged, partial front view of the hanger of FIG. 1.

Referring to FIG. 5, the groove 433 includes a linear groove 4331 and a polygonal groove 4332 communicating with each other. The polygonal groove 4332 includes a plurality of corners 4334. By each corner 4334 the groove 433 defines a protrusion 4333. Each protrusion 4333 includes a sloped wall 43331 and a vertical wall 43332 protruding from the bottom of the polygonal groove 4332. In the clockwise direction, the sloped walls 43331 extend upward from the bottom of the polygonal groove 4332 to the top of the vertical wall 43332, and the vertical walls 43332 extends downward to the bottom of the polygonal groove 4332.

The at least one resilient member 44 is disposed between the hanger 43 and the base 41 to apply a force to the hanger 43. In the embodiment, the resilient member 44 is a coil spring which is placed around the rod 415 and retained in the cavity 434.

The movable member 45 includes a first end 451 and a second end 452. The first end 451 is rotatably retained within the hole 414 of the base 41. The second end 452 is an angled end. The angled end 452 is received in the groove 433 of the hanger 43, allowing the movable member 45 to revolve around the first end 451. Because the spring tab 422 applies a spring force against the movable member 45, the movable member 45 can always stay in contact with the bottom of the groove 433.

Figure 6:
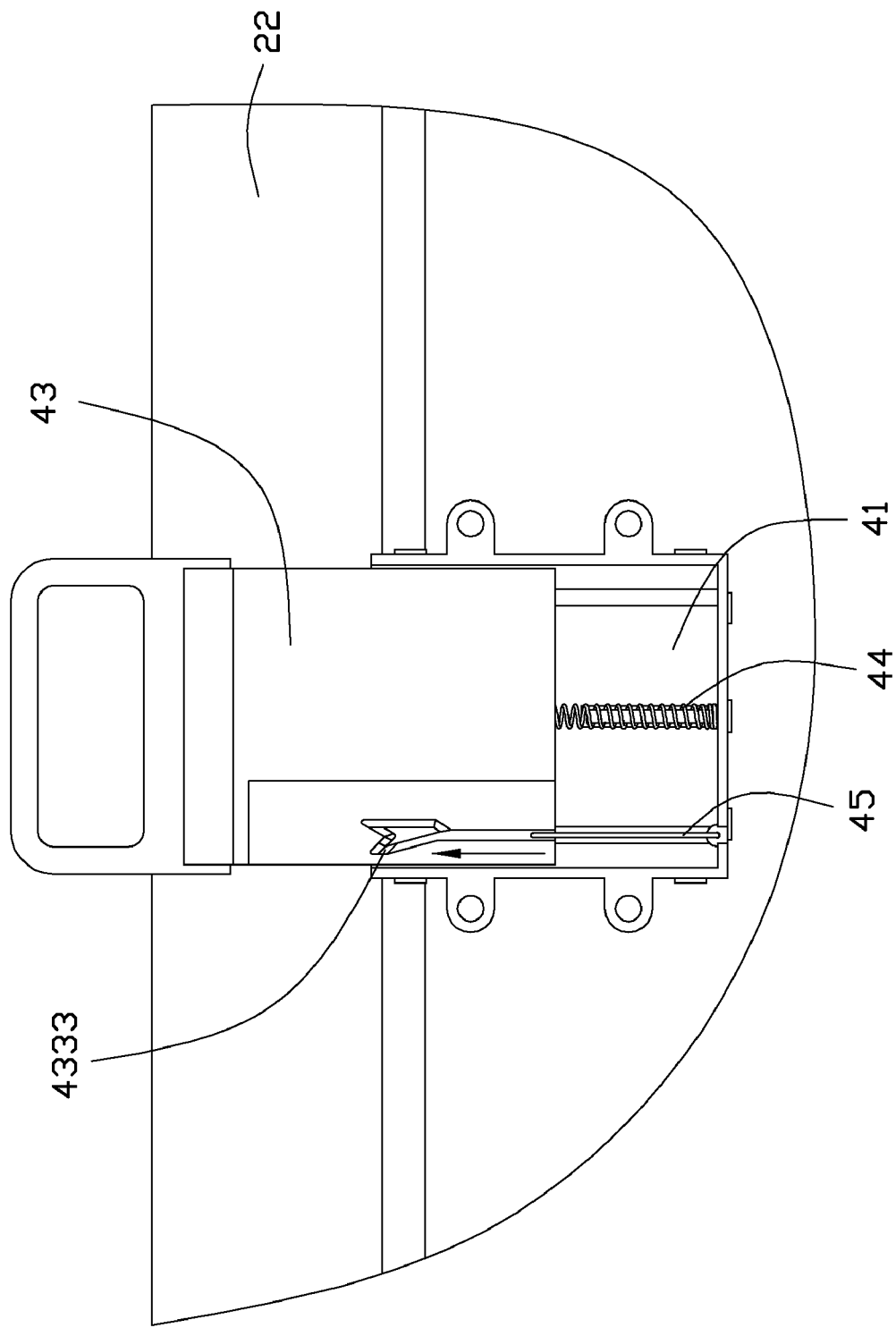
FIG. 6 is an enlarged view of the hanger in the extended state.

Referring to FIG. 6, the hanger 43 is shown extended out of the housing 20. The angled end 452 of the movable member 45 abuts against the bottom of the linear groove 4331 of the hanger 43. When the hanger 43 is pushed into the housing 20, the angled end 452 will slide in the polygonal groove 4332, as indicated by the arrow in FIG. 6.

Figure 7:
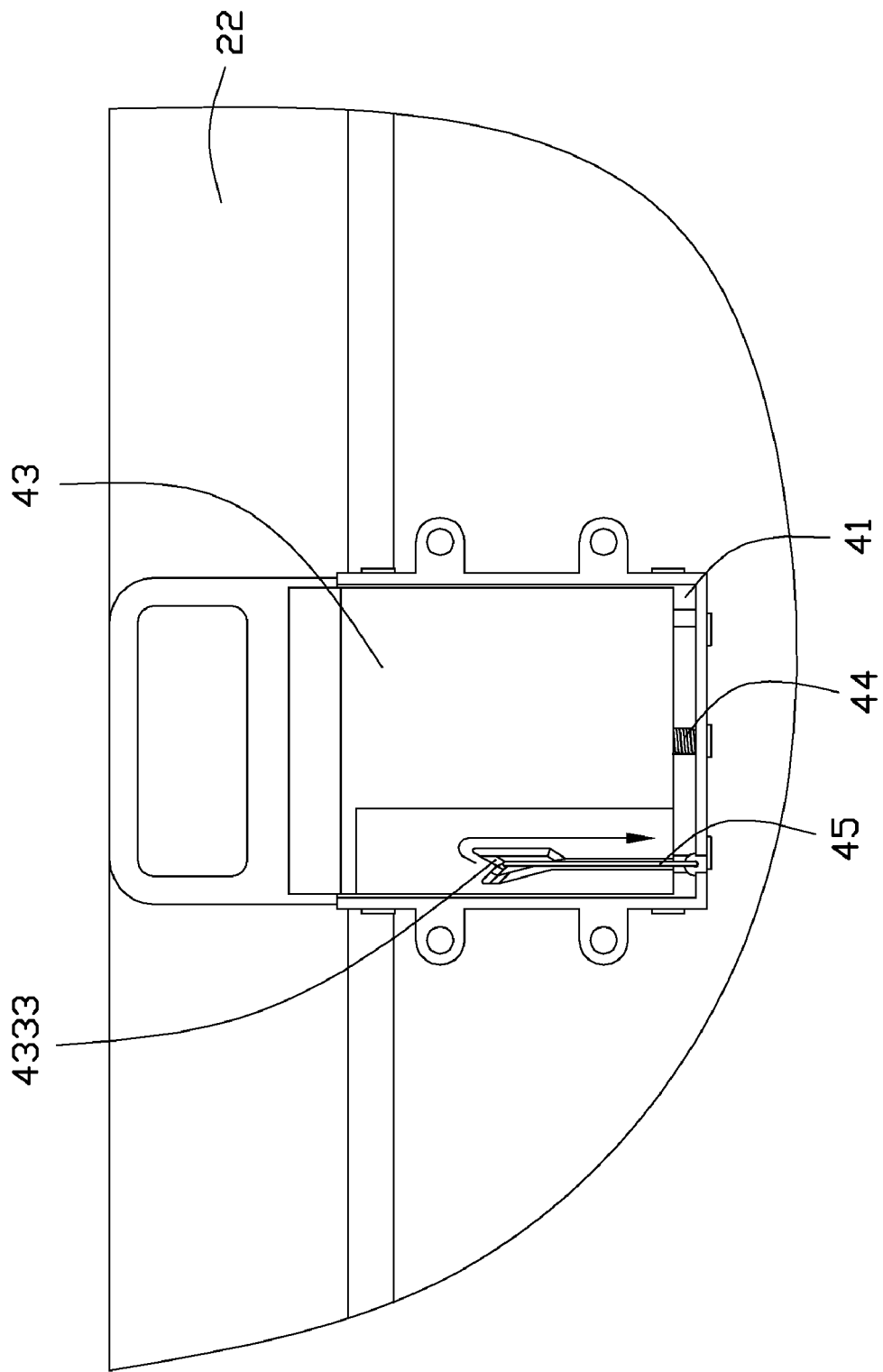
FIG. 7 is an enlarged view of the hanger in the retracted state.

Referring to FIG. 7, after the hanger 45 is fully received in the housing 20 with the top end flush with the top of the housing 20, the resilient member 44 is compressed to apply a force that the angled end 452 rests on the corner 4334. The angled end 452 hooks the corner 4334 preventing the hanger 43 from disengaging from the housing 20. When the hanger 43 is pushed further in, the angled end 452 slides in the polygonal groove 4332 in the clockwise direction, as indicated by the arrow of FIG. 7, back to the linear groove 4331 as shown in FIG. 6.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device having a retractable hanger, comprising:

a housing;

a display panel mounted on the housing; and a hanging mechanism arranged in the housing, comprising:

a base secured in the housing;

a hanger defining a hanging hole, a groove comprising a plurality of corners and a plurality of protrusions correspondingly by each corner, wherein the hanger is slidably connected to the base;

a movable member comprising a first end and a second end, wherein the first end is rotatably connected to the base and the second end is an angled end that is movably received in the groove of the hanger; and at least one resilient member arranged between the hanger and the base to apply a pushing force to the hanger;

wherein when pressed, the hanger is pushed into the base, the second end of the movable member slides along the groove till resting on one of the plurality of corners, the second end hook the corner that retains the hanger in the housing.

2. The electronic device as described in claim 1, wherein the base defines two parallel slots and the hanger defines two ribs slidably received in the slots, respectively, such that the hanger can move from an extended state to a retracted state.

3. The electronic device as described in claim 1, wherein the hanger defines a cavity and the base defines a rod retained within the cavity.

4. The electronic device as described in claim 1, wherein the resilient member is a coil spring coiled around the rod.

5. The electronic device as described in claim 1, wherein the groove comprises a linear groove, a polygonal groove with a plurality of corners and a plurality of protrusions by the corners.

6. The electronic device as described in claim 5, wherein the protrusions each includes a sloped wall and a vertical wall, wherein the sloped wall slopes upward from the bottom of the polygonal groove to the top of the vertical wall and the vertical wall slopes downward to the bottom of the polygonal groove.

7. The electronic device as described in claim 1, wherein the hanging mechanism further includes a cover disposed on the base.

8. The electronic device as described in claim 1, wherein the cover defines an opening and a spring tab with one end free in the opening, which constitutes a cantilevered structure that the spring tab can thus be deflected elastically to apply a force to the movable member that the second end can always stay in contact with the bottom of the groove.

* * * * *